J. W. CLARK.
VALVE.
APPLICATION FILED AUG. 28, 1917.
1,324,385.
Patented Dec. 9, 1919.
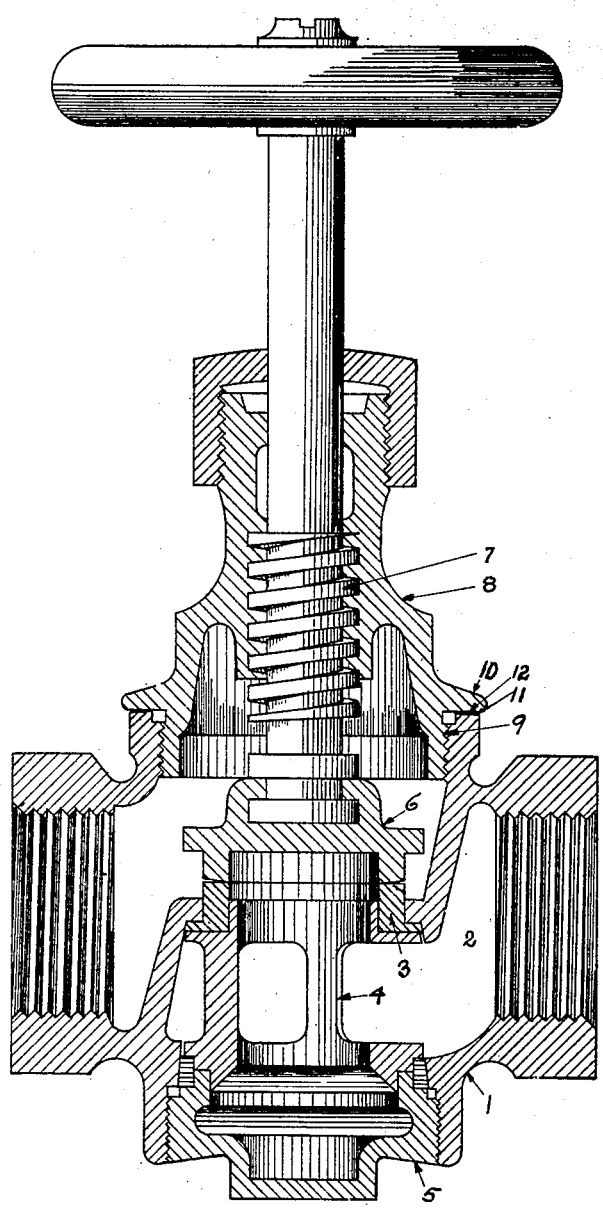
Inventor
Julian W. Clark
By
Attorney

UNITED STATES PATENT OFFICE.

JULIAN W. CLARK, OF NORTH WARREN, PENNSYLVANIA, ASSIGNOR TO THE BASHLIN COMPANY, OF WARREN, PENNSYLVANIA, A CORPORATION OF PENNSYLVANIA.

VALVE.

1,324,385.  Specification of Letters Patent.  Patented Dec. 9, 1919.

Application filed August 28, 1917. Serial No. 188,551.

*To all whom it may concern:*

Be it known that I, JULIAN W. CLARK, a citizen of the United States, residing at North Warren, in the county of Warren and State of Pennsylvania, have invented new and useful Improvements in Valves, of which the following is a specification.

This invention relates to valves and consists in certain improvements in the construction thereof as will be hereinafter fully described and pointed out in the claims.

The invention is illustrated in the accompanying drawing which shows a central vertical section through the valve.

1 marks the valve body, 2 the diaphragm in the body, 3 the valve seat, 4 the follower for holding the valve seat in place, 5 a plug for securing the follower, 6 the valve disc, 7 the screw-threaded valve stem, 8 the bonnet, and 9 a screw-threaded opening in the body into which the bonnet is screwed for securing the bonnet on the body. All these parts are formed of the usual valve metal.

In making valves difficulty has been experienced in making the joint surfaces tight. I have discovered that by making at least one of these surfaces slightly tapered, so that the initial contact is at the inner periphery of the surfaces and next the opening, a tight joint may be accomplished even though there is a slight irregularity in the surfaces. This is particularly advantageous in the joint between the bonnet and the body. In forming this joint I make the joint surface 11 on the body slightly tapered and backed by the cylindrical wall of the body so that the joint surface 12 on the projection 10 of the bonnet in seating makes contact at the inner periphery of these surfaces, the taper being such as to crowd the surface 11 inward. When pressure is applied to the bonnet the intial contact takes place at the inner periphery next the opening and the metal of the wall is slightly sprung, or at least finds a more perfect bearing than is possible with a flat surface.

I prefer to make the surface 12 flat, but the invention in its broader aspects is not so limited.

What I claim as new is:—

1. A joint comprising two members having annular metallic surfaces and means for forcing them into contact, one of said members having an opening therethrough and the other member having its annular surface tapered and having a cylindrical wall directly back of said tapered surface receiving the direct thrust of said means, and the other of said surfaces being shaped to make the initial contact of said surfaces at the inner periphery.

2. A joint comprising two members having annular metallic surfaces and means for forcing them into contact, one of said members having an opening therethrough and the other member having its annular surface tapered and having a cylindrical wall directly back of said tapered surface receiving the direct thrust of said means, and the other of said surfaces being flat making the initial contact of said surfaces at the inner periphery.

3. In a valve, the combination of a body having an opening and an annular metallic seating surface around the opening; and a bonnet secured to the body and having a seating surface opposed to the seating surface on the body, one of said surfaces being tapered and backed by a cylindrical wall and the other surface shaped to make the initial contact between the surfaces at their inner periphery.

4. In a valve, the combination of a body having an opening and an annular tapered seating surface around the opening, the wall of said opening directly back of said seating surface being cylindrical; and a bonnet secured to the body and having a flat seating surface opposed to the seating surface on the body making the initial contact of the surfaces at their inner periphery and next the opening.

5. In a valve, the combination of a body having a screw-threaded opening surrounded by a tapered annular seating surface; a bonnet screwed into the opening and having a flat seating surface opposed to the seating surface on the body, making the initial contact at the inner periphery of said surfaces.

6. A valve joint comprising two annular surfaces; and means for forcing them into contact, one of said surfaces having an opening therethrough and being tapered at an acute angle to the axis of the opening and the other of said surfaces being shaped to make the initial contact of said surfaces at the inner periphery whereby the metal of the surface surrounding the opening is crowded inwardly toward the opening.

In testimony whereof I have hereunto set my hand.

JULIAN W. CLARK.